United States Patent Office 3,169,931
Patented Feb. 16, 1965

3,169,931
METHOD OF PREPARING AN ALUMINA-SILICA SUPPORTED CATALYST COMPOSITION
Armand J. de Rosset, Clarendon Hills, and Mark J. O'Hara, Chicago, Ill., assignors to Universal Oil Products Company, Des Plaines, Ill., a corporation of Delaware
No Drawing. Filed Dec. 6, 1960, Ser. No. 73,988
16 Claims. (Cl. 252—453)

The present invention relates to the manufacture of alumina, and is particularly directed toward the preparation of alumina through novel means which permit the alumina to be derived from aluminum sulfate as the sole source of the aluminum. When employed as a carrier material for catalytically active metallic components in the manufacture of hydrocarbon conversion catalysts, the alumina of the present invention results in a more active catalyst, particularly with respect to those catalysts employed for the hydrodesulfurization of hydrocarbons and mixtures of hydrocarbons.

Alumina, in its many anhydrous forms, as aluminum oxide hydrate, or as aluminum hydroxide, is extensively employed throughout the chemical and petroleum industries as a dehydrating, treating or purifying agent. Although alumina may be employed as a catalyst in and of itself, it is most often utilized as the carrier material for a wide variety of catalytically active metallic components in the manufacture of diverse conversion catalysts. One of the first commercial methods employed for the production of alumina, involved the recovery of aluminum oxide from naturally-occurring clays, ores, and earths. This method involves a long, arduous process and produced a comparatively low grade, relatively expensive alumina. Many investigations have since been conducted in regard to a variety of manufacturing procedures in order to produce a relatively inexpensive, high purity alumina. Precipitation methods have been studied whereby a weak alkaline material, such as an aqueous solution of ammonium hydroxide, is added to an aqueous solution of an aluminum salt, thereby forming a precipitate of alumina. However, due to certain physical characteristics imparted to the resulting alumina, and which inherently result from the use of ammonium hydroxide with some of the aluminum salts, the precipitate thus formed is difficult to convert to a form which is suitable for any of the functions previously described. Consequently, other more expensive alkaline materials must be employed as the precipitating agent, and the precipitation methods become difficult to justify economically. Similarly, although the alkaline precipitant may be suitable, not all of the salts of the aluminum are advantageously employed. For example, when aluminum sulfate, readily obtainable at low cost, is utilized as a source of aluminum, the gelatinous precipitate resulting from the use of ammonium hydroxide is notoriously difficult to process to its final form. Washing to remove the various contaminants is extremely tedious, and, although washing by filtration is employed, long periods of time are required to produce an acceptable filter cake which can be dried readily, subsequently formed into the desired shape and/or further treated for utilization as a carrier material for catalytically active metallic components. Other difficulties, generally arising as a result of using aluminum sulfate as the source of aluminum, include the relatively low crushing strength of the final alumina particles, the poor surface area characteristics and the high apparent bulk density, which factors do not make this type of alumina attractive for use as a carrier material.

The object of the present invention is to provide a method of preparing alumina, permitting the utilization of aluminum sulfate as the source thereof while producing an alumina which is particularly adaptable for use as a carrier material.

In a broad embodiment, the method of the present invention involves preparing alumina from aluminum sulfate by initially forming a first precipitate of basic aluminum sulfate, maintaining a constantly acidic pH during the formation of said first precipitate, forming a second precipitate at a pH in excess of about 8.0, through the addition of aluminum sulfate to an alkaline precipitant, admixing said first and second precipitates in a weight ratio, of the alumina-equivalent of said second precipitate to that of said first precipitate, in excess of about 1:6, drying the resulting slurry and subjecting the dried slurry to a calcination procedure at an elevated temperature to produce alumina.

In another embodiment, the present invention relates to a method for preparing alumina from aluminum sulfate, which method comprises forming a first precipitate of basic aluminum sulfate, maintaining a constantly acidic pH within the range of from about 5.5 to about 6.5 during the formation of said first precipitate, forming a second precipitate through the addition of aluminum sulfate to an alkaline precipitant at a pH within the range of from about 8.0 to about 11.0, admixing said first and second precipitate in a weight ratio of the alumina-equivalent of said second precipitate to that of said first precipitate within the range of from about 1:6 to about 6:1, drying the resulting slurry at a temperature of from about 100° to about 300° C., and subjecting the dried slurry to a calcination procedure, in an atmosphere of air, at a temperature within the range of from about 400° to about 800° C. to produce alumina.

In a preferred embodiment, the present invention is directed toward a method for preparing alumina from aluminum sulfate, which method comprises initially forming a precipitate of basic aluminum sulfate, maintaining a constantly acidic pH during the formation of said precipitate, adding additional alkaline precipitant to said precipitate to increase the pH of the resulting slurry to a level in excess of about 8.0, adding aluminum sulfate to said slurry to form additional precipitate, the weight ratio of the alumina-equivalent of said additional precipitate to that of the basic aluminum sulfate precipitate, being in excess of about 1:6, drying the total precipitate and subjecting the dried precipitate to a calcination procedure at an elevated temperature to produce alumina.

The present invention further provides a method for preparing a highly active hydrodesulfurization catalyst which comprises initially forming a precipitate of basic aluminum sulfate from a solution of aluminum sulfate, maintaining a constantly acidic pH within the range of from about 5.5 to about 6.5 during the formation of said precipitate, adding additional alkaline precipitant to said precipitate to increase the pH of the resulting slurry to a level of from about 8.0 to about 11.0, adding aluminum sulfate to said slurry to form additional precipitate, the weight ratio of the alumina-equivalent of said additional precipitate to that of the basic aluminum sulfate precipitate being within the range of from about 1:6 to about 6:1, drying the total precipitate at a temperature within the range of about 100° to about 300° C., calcining the dried precipitate at a temperature of from about 400° to about 800° C., to produce alumina, impregnating the calcined alumina with about 6% to about 30% by weight of molybdenum and from about 1% to about 6% by weight of nickel, drying the impregnated alumina and calcining the same at a temperature within the range of about 400° to about 800° C.

From the foregoing embodiments, it will be seen that the present invention involves the commingling of two precipitates, both of which are obtained from a solution of aluminum sulfate. The first precipitate is basic aluminum sulfate which is formed at a constantly acidic pH, whereas the second precipitate is formed at a distinctly alkaline pH, the latter being in excess of about 8.0, having an upper limit of about 11.0. The final alumina-containing gel, or slurry, which, upon drying and calcination produces the alumina of the present invention, consists essentially of a mixture of the two precipitates. In the present specification, and appended claims, the term "alumina-equivalent" is designated to mean that quantity of aluminum oxide ($Al_2O_3$) which would result if all the aluminum existing within the precipitate were converted thereto. The term is employed as a convenient means of determining the individual quantities of the two precipitates which are commingled to form the alumina-containing slurry from which the alumina of the present invention is produced.

The present invention involves the precipitation, from a solution of aluminum sulfate, of basic aluminum sulfate. Although any suitable method may be employed in the formation of this particular precipitate, it has been found that a convenient, efficient means involves precipitation through the utilization of ammonium hydroxide at a constantly acidic pH level. During the commingling of the ammonium hydroxide with the aluminum sulfate, the pH of the resulting basic aluminum sulfate slurry is controlled at a level of about 6.0; that is, within the range of from about 5.5 to about 6.5. This procedure produces a basic aluminum sulfate having an aluminum to sulfate ratio of about 1.35, existing as a dense, granular precipitate having a high solids content, and which is easily subjected to filtration due to its more granular characteristics. This basic aluminum sulfate is commingled, as an essential feature of the present invention, with a precipitate formed at a pH level which is distinctly alkaline.

It should be noted that the second precipitate, formed at an alkaline pH, utilizes reverse precipitation. Reverse precipitation involves adding the aluminum sulfate solution to an excessive amount of the precipitant, in this case, ammonium hydroxide. This is distinguished from standard precipitation methods wherein the ammonium hydroxide is added to the solution of aluminum sulfate. The precipitate prepared by reverse precipitation results in a calcined alumina of high apparent bulk density, possessing a crushing strength generally in excess of about 10.0 pounds. Although the alumina-containing gel is somewhat difficult to filter, the filtration thereof is not as tedious and prolonged as that experienced when the precipitate is formed by the conventional precipitation methods. Furthermore, the alumina resulting from the conventional precipitation, that is where the ammonium hydroxide is added to the aluminum sulfate, generally yields a soft, powdery alumina which is difficult to process to its final form. By commingling the acidic precipitate and the reverse alkaline precipitate, an alumina-containing slurry results which has all of the desired characteristics of the individual precipitates and virtually none of the disadvantages of the two. That is, the alumina, resulting from the slurry of the two precipitates, possesses an intermediate bulk density and a relatively high crushing strength. In addition, as hereinafter indicated in a specific example, the alumina of the present invention, when employed as the carrier material for catalytically active metallic components, unexpectedly results in a highly active catalytic composite.

The method of the present invention produces an alumina which is advantageously employed as a carrier material in the manufacture of a variety of hydrocarbon conversion catalysts. In particular, the alumina may be advantageously employed in a composite which comprises metals selected from the group consisting of chromium, molybdenum, tungsten, iron, cobalt, nickel, ruthenium, rhodium, palladium, osmium, iridium, platinum, and mixtures of two or more, etc. As hereinafter indicated, the alumina of the present invention is especially adaptable to the manufacture of hydrodesulfurization catalysts comprising at least one metallic component selected from the group consisting of Groups VI–A and the iron-group of the Periodic Table. Therefore, the alumina of the present invention, in one embodiment, is employed as a carrier material for a catalyst comprising from about 6% to about 30% by weight of molybdenum and from about 1% to about 6% by weight of at least one metal from the iron-group of the Periodic Table.

In many instances, it will be preferred to utilize the alumina of the present invention in combination with one or more other refractory inorganic oxides. Such inorganic oxides include silica, zirconia, magnesia, titania, thoria, boria, hafnia, etc., and particularly silica. When silica is employed in combination with the alumina, the silica is present in an amount in excess of about 10.0% by weight, based upon the total weight of the alumina-silica composite. The alumina will generally be present in the greater proportion, the silica concentration being within the range of from about 10.0% to about 40.0% by weight. Although the other refractory inorganic oxides may be combined with the alumina in any suitable manner, a convenient means consists of coprecipitating the other refractory oxide material, such as silica, with the constantly acidic, alumina-containing precipitate. For example, water glass, in the concentration necessary to composite the desired quantity of silica, may be intimately commingled with the aqueous solution of aluminum sulfate, the resulting mixture being employed with the ammonium hydroxide in forming the first precipitate at a constantly acidic pH within the range of about 5.5 to about 6.5.

The commingling of the individual precipitates may be effected in any suitable, desired manner. The two precipitates may be individually formed, under the particular conditions hereinbefore set forth, the resulting wet alumina-containing gels being intimately commingled following the initial filtration thereof. Each alumina-containing gel may be separately filtered and dried at a temperature within the range of about 100° to 300° C., the dried gels being subsequently commingled with each other. As hereinafter indicated, a significantly more active catalytic composite results when the second, alkaline precipitate is formed in the presence of the first acidic precipitate. By this method, the first precipitate of basic aluminum sulfate is formed at a constantly acidic pH, an excess quantity of ammonium hydroxide being added to increase the pH to an alkaline level in excess of about 8.0, and the second precipitate being formed through the addition of aluminum sulfate to the resulting alkaline slurry. In any event, the quantity of the alkaline precipitate, employed in admixture with the basic aluminum sulfate precipitate, is such that the weight ratio of the alumina-equivalent of said second precipitate to that of said first precipitate, lies within the range of from about 1:6 to about 6:1.

Briefly, therefore, the present invention involves adding a sufficiently small amount of aluminum sulfate to a small amount of water to bring the initial contents of the vessel to the acidic pH level at which the commingling and precipitation of basic aluminum sulfate are effected. The solutions of ammonium hydroxide and aluminum sulfate are then simultaneously added, the rates of either, or both being continuously adjusted to maintain and pH of the resulting mixture at that level originally selected. When the desired quantity of alumina-containing slurry has been precipitated, the addition of aluminum sulfate is stopped and the addition of the solution of ammonium hydroxide contained until the pH is increased to a level in excess of about 8.0, with an upper limit of about 11.0. Additional aluminum sulfate is then added to the now alkaline mixture, in an amount to form the quantity of additional precipitate necessary to result in the previously determined alumina-equivalent weight ratio. The resultant mixture is then filtered, and subsequently washed with water containing minor quantities of ammonium hydroxide. Generally, the washing is effected until the filter cake contains less than about 2.0% by weight of sulfate. The precipitate filters very rapidly, and produces a cake which has a relatively high solids content. The filter cake is then dried at a temperature within the range of about 100° to about 300° C., and thereafter calcined at an elevated temperature within the range of about 400° to about 800° C. When the calcined alumina is intended for use as a carrier material in the manufacture of hydrocarbon conversion catalysts, the alumina particles, after being formed into the desired size and/or shape, may be combined with the catalytically active metallic components in any suitable manner.

A particularly convenient method of incorporating the catalytically active metallic components with the carrier material involves impregnating techniques utilizing water-soluble compounds of the metals composited therewith. Suitable water-soluble compounds include, nickel nitrate, nickel chloride, chloroplatinic acid, molybdic acid, chloropalladic acid, dinitrito-diamino platinum, etc. The metallic components will generally be composited with the calcined carrier material in amounts up to about 30.0% by weight, calculated as the elements thereof. Lesser quantities of the platinum-group metals will be utilized, and will lie within the range of from about 0.01% to about 2.0% by weight. As hereinafter indicated, the alumina of the present invention forms an excellent carrier material for metallic components having hydrodesulfurization activity. Such metallic components include the metals of Groups VI-A and VIII of the Periodic Table, and will generally comprise at least one metallic component selected from the iron-group. The metals from Group VI-A will be employed within the range of from about 1.0% to about 30.0% by weight; when the group VI-A metallic component is molybdenum, the concentration thereof will be from about 6.0% to about 30.0% by weight. The iron-group metallic components, iron, cobalt, and nickel, are employed in quantities less than that of the Group VI-A metallic component, and will be within the range of from about 1.0% to about 6.0% by weight. The hydrodesulfurization catalyst, for example, containing both molybdenum and nickel, may be prepared in any suitable manner, the utilization of impregnating techniques being particularly preferred. The impregnation may be effected in a single step or in two individual steps with intervening high-temperature calcination treatment. Following the impregnation of the alumina carrier material with the catalytically active metallic components, the alumina is dried at a temperature of from about 100° C. to about 300° C., and thereafter subjected to calcination in the presence of air at a temperature of 400° C. to about 800° C.

The catalytically active metallic components may be caused to exist in any desired form, such as the elements, oxides, and/or sulfides thereof, etc. When the catalytic composite is intended to be sulfided prior to use, such sulfidation is conveniently effected through the utilization of vaporous sulfur-containing compounds such as hydrogen sulfide. The hydrodesulfurization catalyst may be employed to great advantage in processes designed to prepare saturated hydrocarbon charge stocks which are substantially free from sulfurous and nitrogenous compounds. Recent developments within the petroleum industry have indicated that catalytic reforming processes utilizing a catalyst consisting primarily of platinum and aluminum, and particularly a composite which also contains combined halogen, are especially useful in the reforming of hydrocarbons and mixtures of hydrocarbons for the purpose of increasing the anti-knock characteristics thereof. Through the proper selection of operating conditions, these platinum-containing catalysts may be utilized for a relatively extended period of time when processing hydrocarbon fractions comparatively free from the foregoing contaminants. However, when processing charge stocks containing excessive concentrations of sulfurous and nitrogenous compounds, a selective poisoning of the platinum-containing catalyst results, accompanied by a significant decline in the activity and stability thereof.

Hydrodesulfurization catalysts are very effective in purifying hydrocarbon charge stocks in a manner whereby metallic contaminants are removed, combined sulfur and nitrogen are converted to hydrogen sulfide and ammonia, and olefinic hydrocarbons are saturated to form paraffins and naphthenes. It becomes difficult to effect a successful reforming process on a high unsaturated charge stock containing large quantities of sulfurous and nitrogenous compounds; the unsaturated components exhibit the tendency to polymerize, forming a highly hydrocarbonaceous material which becomes deposited upon the platinum containing catalyst. The sulfur and nitrogen compounds are caused to form hydrogen sulfide and ammonia, both of which exhibits adverse effects toward the reforming catalyst.

The following examples are given for the purpose of illustrating the present invention, and indicate the method of preparing highly active alumina from a solution of aluminum sulfate, which alumina was employed as a carrier material for the hydrodesulfurization catalysts indicated in the examples. It is understood that slight modifications of the experimental process flow and equipment, as well as insignificant changes in the conditions, reagents and concentrations employed within these examples, are not considered to be outside the broad scope of the present invention. In these examples, reference is made to "Standard Relative Activity" test method. The relative activity of a particular catalyst is defined as the ratio of the space velocity required to result in a given product improvement, while employing a test catalyst, to that space velocity required to yield the same degree of product improvement while employing a primary, standard catalyst, which relative activity is expressed as a percentage, being termed the "relative activity coefficient." The catalyst employed as the primary, standard catalyst (one having a relative activity coefficient of 100), was an alumina-cobalt-molybdenum composite consisting of about 2.2% by weight of cobalt and about 5.9% by weight of molybdenum as the elements thereof, this catalyst being typical of the hydrodesulfurization catalysts currently employed. The product quality improvement was measured in terms of the residual basic nitrogen content of the liquid product: since the removal of nitrogenous compounds is that function of the hydrodesulfurization catalyst most difficult to achieve, the relative activity of the catalytic composite is more logically based thereupon, rather than on an improvement in either the sulfur concentration, or the quantity of olefinic hydrocarbons remaining in the hydrocarbon charge following treatment with the hydrodesulfurization catalyst.

The Standard Relative Activity Test method consists essentially of processing a thermally-cracked California naphtha which is characterized by an API gravity of 43.3° at 60° F., an initial volumetric distillation point of 290° F., a 50% distillation point of 320° F., and an end boiling point of 392° F. The thermally-cracked naphtha contains 1.46% by weight of sulfur, 240 p.p.m. of basic nitrogen and has a bromine number of 61, the latter indicating that the naphtha contains a significantly deleterious quantity of unsaturated hydrocarbons. The charge stock is passed to a reaction zone fabricated from one-inch, schedule 80, type 316 stainless steel, equipped with a thermocouple-well to which perforated baffle plates are fastened to serve as the vaporization, preheating and mixing zone for the hydrogen and liquid hydrocarbon charge. The reactor contains a single catalyst bed of about 50 cubic centimeters, and is maintained under an imposed hydrogen pressure of about 800 pounds per square inch, hydrogen being recycled therethrough at a rate equivalent to about 3,000 standard cubic feet per barrel of liquid charge; in each instance, the inlet temperature to the catalyst bed is 700° F. Three distinct, individual test procedures are effected at various liquid hourly space velocities within the range of about 2.0 to about 10.0. The liquid product effluent, upon which the product inspections are made, is collected over a period of operation of about four to about seven hours. The basic nitrogen concentration in each of the three liquid products is plotted on a logarithmic scale against the reciprocal of the three space velocities employed. From the resulting curve, drawn through the three points, a determination is made of the reciprocal of the space velocity required to yield a liquid product having a residual basic nitrogen content of 2.0 p.p.m. The relative activity of the test catalyst is derived from the ratio of the reciprocal space velocity to yield 2 p.p.m. basic nitrogen, in regard to the primary standard catalyst compared to that catalyst being tested. The ratio is multiplied by a factor of 100 and a relative activity coefficient greater than 100 indicates a test catalyst having a greater activity than the primary standard catalyst. Obviously, a catalyst having a relative activity less than 100 is less active than the primary standard catalyst. The test catalyst was prepared by impregnating ⅛-inch x ⅛-inch alumina pills with a single impregnating solution of molybdic acid containing 85% by weight of molybdenum oxide and sufficient cobalt nitrate to composite 2.2% by weight of cobalt. The alumina was prepared by precipitating an alumina gel from a solution of aluminum chloride, the precipitate being dried and subsequently calcined at an elevated temperature of about 1100° F. Following the impregnation, this standard catalyst was subjected to a second calcination procedure, in an atmosphere of air, followed by a sulfiding technique utilizing a stream of pure hydrogen sulfide diluted only by an inert gaseous material; the sulfiding technique was effected at an elevated temperature of about 750° F. As hereinabove set forth, this standard catalyst, without prior sulfidation, has a relative activity of 100; when sulfided prior to the activity test, the relative activity coefficient is about 130.

EXAMPLE I

This example is given to illustrate individually the reverse precipitation, and constantly acidic pH precipitation methods of manufacturing alumina from aluminum sulfate, and to indicate the results obtained when the final aluminas are employed as carrier material in the manufacture of hydrodesulfurization catalysts. The reverse precipitation method was effected by dissolving 1745 grams of aluminum sulfate in 2300 ml. of water. Water glass, in an amount of 150 grams was diluted with 150 ml. of water, the dilute water glass being added to 45 ml. of concentrated hydrochloric acid in 100 ml. of water. This acid silica-containing hydrosol was added to the aluminum sulfate solution, the mixture being added to 1200 ml. of a 28% by weight solution of ammonium hydroxide in an additional 1200 ml. of water. During the precipitation, the pH was constantly alkaline, the final pH being 8.0; an additional 25 ml. of the ammonium hydroxide was added to insure complete precipitation, raising the pH to a level of about 8.2. The gel was filtered and subsequently washed at a temperature of 85° C. for a period of eight hours with about five gallons of water containing 25 ml. of hydrochloric acid and 30 ml. of ammonium hydroxide. The gel was removed from the washing towers and dried at a temperature of 150° C. for a period of 16 hours, subsequently being formed into ⅛-inch x ⅛-inch pills. The crushing strength of the pills, prior to calcination, was 13.7, and following calcination at a temperature of about 1100° F., in an atmosphere of air, the crushing strength was 18.4 pounds. The final alumina-containing particles consisted of 12.0% by weight of silica, based upon the total weight of the alumina-silica composite. 50 grams of these calcined pills were impregnated in a double impregnation procedure utilizing 11.4 grams of molybdic acid containing 85% by weight of molybdenum oxide, dissolved in 30 ml. of water and 12 ml. of ammonium hydroxide. The pills were dried for three hours at a temperature of 150° F., and oxidized for one hour at a temperature of 800° F. Nickel nitrate hexahydrate, in an amount of about 12.3 grams, was diluted to a total volume of 76 ml. with water and employed in a second impregnation procedure. The pills were subsequently dried for three hours at 150° C., and oxidized for one hour at 1100° F. The final catalyst contained 9.45% by weight of molybdenum, and 3.3% by weight of nickel, as the oxides thereof, calculated on the basis of the weight of the alumina-silica composite. The final catalyst had an apparent bulk density of 0.79 gram per cubic centimeter, and when subjected to the previously described relative activity test, following sulfidation at a temperature of 750° F., indicated a relative activity coefficient of about 160.

An alumina-silica carrier material was prepared utilizing the constantly acidic pH precipitation by initially diluting 107 grams of water glass with 100 ml. of water, 35 ml. of hydrochloric acid and 17 ml. of water. The acid silica-containing hydrosol was added to 2300 ml. of aluminum sulfate having a specific gravity of 1.28. The resulting mixture was simultaneously commingled with ammonium hydroxide, at a controlled pH of 6.0 to precipitate basic aluminum sulfate. Following filtration and washing, the gel was dried for a period of 16 hours at 150° C. and calcined at an elevated temperature of 1100° F. before calcining, the crushing strength of the alumina-silica pills was 3.6 pounds, and 4.2 pounds following the high-temperature calcination; the apparent bulk density of the calcined pills was 0.24. A second portion of alumina-silica pills was prepared by the constantly acidic pH precipitation method. As contrasted to the previous alumina-silica composite, containing 12.0% by weight of silica, the second portion contained only 2.1% by weight of silica. These alumina-silica pills had a crushing strength, following calcination of 7.7 pounds and an apparent bulk density of 0.39 gram/cc. 30 grams of these alumina-silica pills were impregnated with an impregnating solution containing 7.1 grams of molybdic acid dissolved in 15 ml. of water and 15 ml. of ammonium hydroxide, 3.4 grams of nickel nitrate hexahydrate and 3.0 grams of nickel chloride hexahydrate. Additional water was utilized to increase the volume of the solution to 88.0 ml. The impregnated pills were dried for a period of three hours at a temperature of 150° C. and oxidized for a period of one hour at a temperature of 1100° F. Prior to being subjected to the relative activity test, this catalyst, containing 10.0 grams of molybdenum oxide and 3.14 grams of nickel oxide, per 100 grams of the alumina-silica composite, was sulfided at a temperature of 750° F. utilizing hydrogen sulfide. The results of the standard activity test indicated that this catalyst had a relative activity coefficient of 131.

EXAMPLE II

The alumina employed to prepare the hydrodesulfurization catalyst of this example consisted of 669 grams of the once-filtered silica-containing gel prepared by the reverse precipitation method of Example I, and 852 grams of the filtered gel from the constantly acidic pH precipitation. The two silica-containing gels were commingled, while in the wet state, the foregoing quantities resulting in a 3:1 weight ratio of the alumina-equivalent of the reverse precipitation gel to the alumina-equivalent of the constantly acidic pH precipitation gel. The mixture was filtered and washed at a temperature of 85° C. for a period of about eight hours with about five gallons of water. The gel was dried at a temperautre of 150° C. for a period of 16 hours and formed into ⅛-inch by ⅛-inch cylindrical pills. The crushing strength of the dried pills was 9.4 pounds, and following calcination at the elevated temperature of 1100° F., the crushing strength was 14.2 pounds. The pills were impregnated with a single impregnating solution containing 7.1 grams of molybdenum oxide, 3.4 grams of nickel nitrate hexahydrate and 3.0 grams of nickel chloride hexahydrate. The impregnated pills were dried at a temperautre of 150° C. and oxidized for a period of one hour at a temperautre of 1100° F. The final catalyst contained 10.4 grams of molybdenum oxide and 3.15 grams of nickel oxide, calculated on the basis of 100 grams of the alumina carrier material containing 11.6% by weight of silica. When subjected to the relative activity test, following sulfidation, this catalyst, having an apparent bulk density of 0.56 gram/cc., and a final crushing strength of 12.2 pounds, indicated a relative activity coefficient of 220; an analysis indicated that 6.84% by weight of carbon had become deposited upon the catalyst as a result of the standard activity test.

EXAMPLE III

The alumina-silica carrier material of this example was prepared by commingling the reverse precipitate and constantly acidic precipitate from Example I in a weight ratio of the alumina equivalent thereof of 1:1. The commingling was effected after each of the precipitates had been subjected to the drying procedure at 150° C. The mixture was formed into ⅛-inch by ⅛-inch pills, the crushing strength of which was 13.4 pounds following the calcination thereof. The alumina-silica pills were impregnated with a single impregnating solution containing 7.1 grams of molybdenum oxide, 3.4 grams of nickel nitrate hexahydrate, and 3.0 grams of nickel chloride. The impregnated pills were dried at a temperature of 150° C. and calcined for a period of one hour at 1100° F., subsequently being sulfided at 750° F., with hydrogen sulfide. The catalyst, having an apparent bulk density of 0.56 gram/cc., and a crushing strength of 13.4 pounds, contain 3.22 grams of nickel oxide and 10.65 grams of molybdenum oxide, calculated on the basis of 100 grams of the carrier material containing 11.5% by weight of silica. The relative activity coefficient of the sulfided catalyst was 229, and an analysis indicated that 2.37% by weight of carbon had become deposited thereupon.

EXAMPLE IV

This example is given to illustrate the particularly preferred embodiment of the present invention in which the additional, alkaline precipitate is formed in the presence of the previously formed, constantly acidic pH precipitate. Water glass, in an amount of 59.5 grams was diluted with 16 ml. of water, and added to 17.5 ml. of hydrochloric acid in 88 ml. of water. The acid-silica sol was added to 1272 ml. of aluminum sulfate solution, having a specific gravity of 1.28. This mixture was employed with ammonium hydroxide to coprecipitate basic aluminum sulfate and silica at a controlled pH of about 6.0. 1770 milliliters of ammonium hydroxide was added to the resulting basic aluminum sulfate and a separate solution of 179 grams of water glass, 51 ml. of hydrochloride acid and 3840 ml. of aluminum sulfate was prepared. This latter mixture was added slowly to the slurry, the final pH of the total mixture being 8.7. The resulting filter cake was washed, at a temperature of 85° C., with an ammoniacal water solution and subsequently dried for 16 hours at a temperature of 150° C. The foregoing quantities of reagents indicated that the precipitates were blended in an amount such that the weight ratio of the alumina-equivalent of the additional precipitate to that of the constantly acidic pH precipitate was 3:1. The final dried alumina-silica pills had a crushing strength of 11.5 and an apparent bulk density of 0.45. Following impregnation with 7.1 grams of molybdenum oxide, 3.4 grams of nickel nitrate hexahydrate and 3.0 grams of nickel chloride hexahydrate, the pills were dried at a temperature 150° C. and oxidized for one hour at 1100° F. The final catalytic composite had an apparent bulk density of 0.51 and a crushing strength of 11.5 and contained 3.20 grams of nickel oxide and 10.6 grams of molybdenum oxide, calculated on the basis of 100 grams of the alumina-silica composite. This catalyst, following sulfidation in hydrogen sulfide, indicated a relative activity coefficient of 250 and had only 1.84% by weight of the carbon deposited thereupon.

For convenience, and to illustrate more clearly the results of the foregoing examples, the data are summarized in the following table:

*Table.—Relative activity data and catalyst characteristics*

| Catalyst Designation | ABD | PCS | Composition, Wt. Percent | | Carbon Deposition, Wt. Percent | RAC |
| --- | --- | --- | --- | --- | --- | --- |
| | | | NiO | MoO₃ | | |
| A | 0.79 | 18.4 | 3.30 | 9.45 | | 160 |
| B | 0.39 | 7.7 | 3.14 | 10.0 | | 131 |
| C | 0.56 | 12.2 | 3.15 | 10.4 | 6.84 | 220 |
| D | 0.56 | 13.4 | 3.22 | 10.64 | 2.37 | 229 |
| E | 0.51 | 11.5 | 3.20 | 10.6 | 1.84 | 250 |

That the present invention results in alumina which is acceptable for utilization as hereinbefore set forth is evident from the foregoing examples, and particularly from the data as presented in the above table. The alumina-silica prepared from the reverse precipitation of aluminum sulfate (Example I), is shown to have an acceptable crushing strength of 18.4 pounds after calcination, but possesses an undesirably high apparent bulk density after impregnation, and yields a catalyst "A" having the second lowest relative activity coefficient. The alumina-silica composite, prepared by the method which consists of maintaining a constantly acidic pH during the formation of the precipitate, although possessing an exceedingly low apparent bulk density of 0.24 gram/cc., results in extremely soft calcined particles having a crushing strength of only 4.2 pounds. The Standard Relative Activity test was performed on the catalyst prepared from the carrier material having an ABD of 0.39 and a pill crushing strength of 7.7. Furthermore, as indicated by the results of the Standard Relative Activity test, when this type of alumina-silica was utilized as the carrier material for catalyst "B," the relative activity coefficient was only 131, the lowest of the catalysts prepared.

The catalysts prepared from the alumina-silica composites of the present invention, namely, catalysts "C," "D" and "E" (Examples II, III and IV) possessed acceptable apparent bulk densities, and crushing strengths in excess of 10.0 pounds. It should be noted that these alumina-silica composites were prepared by three slightly different methods, all of which involved commingling a constantly acidic pH basic aluminum sulfate precipitate with a reversed-precipitation product of aluminum sulfate. In example II, the two precipitates were commingled following the first filtration and while existing in the wet state; in Example III, the precipitates were separately formed, filtered and dried, and the commingling thereof being effected after the gels had been dried, but prior to formation into pills, followed by calcination; in Example IV, illustrating the preferred method of the present invention, the basic aluminum sulfate was precipitated at the constantly acidic pH level and additional precipitate formed by reverse precipitation, in the presence of the basic aluminum sulfate, at an alkaline pH in excess of 8.0. All of these alumina-silica composites resulted in catalytic composites possessing a relative activity coefficient in excess of 200, the preferred catalyst (Example IV), having the highest relative activity, while resulting in the lowest quantity of carbon deposition.

The foregoing specification and examples illustrate clearly the method of the present invention in utilizing aluminum sulfate to form alumina. The unexpected benefits afforded the manufacture of catalytic composites, employing such alumina, are indicated, and illustrate the utility of the method hereinbefore set forth.

We claim as our invention:

1. A method for preparing alumina from aluminum sulfate which comprises forming a first precipitate of basic aluminum sulfate, maintaining a constantly acidic pH during the formation of said first precipitate, forming a second precipitate at a pH in excess of 8.0, through the addition of aluminum sulfate to an alkaline precipitant, admixing said first and second precipitates in a weight ratio, of the alumina-equivalent of said second precipitate to that of said first precipitate, in excess of about 1:6, drying the resulting slurry and subjecting the dried slurry to a calcination procedure at an elevated temperature to produce alumina.

2. The method of claim 1 further characterized in that said constantly acidic pH is within the range of from about 5.5 to about 6.5.

3. The method of claim 1 further characterized in that said second precipitate is formed at a pH within the range of from about 8.0 to about 11.0.

4. The method of claim 1 further characterized in that said first and second precipitates are admixed in a weight ratio, of the alumina-equivalent of said second precipitate to that of said first precipitate, within the range of from about 1:6 to about 6:1.

5. A method for preparing alumina from aluminum sulfate which comprises forming a first precipitate of basic aluminum sulfate, maintaining a constantly acidic pH within the range of from about 5.5 to about 6.5 during the formation of said first precipitate, forming a second precipitate, through the addition of aluminum sulfate to an alkaline precipitant, at a pH within the range of from about 8.0 to about 11.0, admixing said first and second precipitates in a weight ratio, of the alumina-equivalent of said second precipitate to that of said first precipitate, within the range of from about 1:6 to about 6:1, drying the resulting slurry at a temperature of from about 100° to about 300° C. and subjecting the dried slurry to a calcination procedure at a temperature within the range of from about 400° to about 800° C. to produce alumina.

6. A method for preparing alumina from aluminum sulfate which comprises initially forming a precipitate of basic aluminum sulfate, maintaining a constantly acidic pH during the formation of said precipitate, adding additional alkaline precipitant to said precipitate to increase the pH of the resulting slurry to a level in excess of about 8.0, adding aluminum sulfate to said slurry to form additional precipitate, the weight ratio, of the alumina-equivalent of said additional precipitate to that of the basic aluminum sulfate precipitate, being in excess of about 1:6, drying the total precipitate and subjecting the dried precipitate to a calcination procedure at an elevated temperature to produce alumina.

7. The method of claim 6 further characterized in that said constantly acidic pH is within the range of from about 5.5 to about 6.5.

8. The method of claim 6 further characterized in that said additional precipitate is formed at a pH of from about 8.0 to 11.0.

9. The method of claim 6 further characterized in that the weight ratio, of the alumina-equivalent of said additional precipitate to that of the basic aluminum sulfate precipitate, lies within the range of from about 1:6 to about 6:1.

10. A method for preparing alumina from aluminum sulfate which comprises initially forming a precipitate of basic aluminum sulfate, maintaining a constantly acidic pH within the range of from about 5.5 to about 6.5 during the formation of said precipitate, adding alkaline precipitant to said precipitate to increase the pH of the resulting slurry to a level within the range of about 8.0 to about 11.0, adding aluminum sulfate to said slurry to form additional precipitate, the weight ratio, of the alumina-equivalent of said additional precipitate to that of the basic aluminum sulfate precipitate being within the range of from about 1:6 to about 6:1, drying the total precipitate at a temperature of from about 100° to about 300° C., and calcining the dried precipitate at an elevated temperature of about 400° to about 800° C. to produce alumina.

11. A method of preparing a hydrodesulfurization catalyst which comprises initially preparing an alumina carrier material from aluminum sulfate by forming a first precipitate of basic aluminum sulfate, maintaining a constantly acidic pH during the formation of said first precipitate, forming a second precipitate through the addition of aluminum sulfate to an alkaline precipitant maintaining a pH in excess of about 8.0 during the formation of said second precipitate, admixing said first and second precipitates in a weight ratio, of the alumina-equivalent of said second precipitate to that of said first precipitate, in excess of about 1:6, drying the resulting slurry and subjecting the dried slurry to a calcination procedure at an elevated temperature to produce alumina, combining molybdenum and at least one metallic component selected from the iron-group of the Periodic Table with said alumina, drying the resulting composite, and calcining the same at a temperature of from about 400° to about 800° C.

12. The method of claim 11 further characterized in that said hydrodesulfurization catalyst comprises from about 6% to about 30% by weight of molybdenum and from about 1% to about 6% by weight of at least one metallic component from the iron-group of the Periodic Table.

13. A method of preparing a hydrodesulfurization catalyst which comprises preparing an alumina carrier material from aluminum sulfate by forming a first precipitate of basic aluminum sulfate, maintaining a constantly acidic pH within the range of from about 5.5 to about 6.5 during the formation of said first precipitate, forming a second precipitate through the addition of aluminum sulfate to an alkaline precipitant, at a pH within the range of from about 8.0 to 11.0, admixing said first and second precipitates in a weight ratio of the alumina-equivalent of said second precipitate to that of said first precipitate of about 1:6 to about 6:1, drying the resutling total precipitate at a temperature of about 100° to about 300° C., calcining the dried precipitate at a temperature of from about 400° to about 800° C., impregnating the calcined alumina with from about 6% to about 30% by weight of molybdenum and from about 1% to about 6% by weight of nickel, drying the resulting impregnated alumina and thereafter subjecting the same to calcination in an atmosphere of air, at a temperature within the range of about 400° to about 800° C.

14. A method for preparing a hydrodesulfurization catalyst which comprises initially forming a precipitate of basic aluminum sulfate from a solution of aluminum sulfate, maintaining a constantly acid pH within the range of from about 5.5 to about 6.5 during the formation of said precipitate, adding additional alkaline precipitant to said precipitate to increase the pH of the resulting slurry to a level of about 8.0 to about 11.0, adding aluminum sulfate to said slurry to form additional precipitate, the weight ratio of the alumina-equivalent of said additional precipitate to that of the basic aluminum sulfate precipitate being within the range of from about 1:6 to about 6:1, drying the total precipitate at a temperature within the range of about 100° to about 300° C., calcining the dried precipitate at a temperature of about 400° to about 800° C., to produce alumina, impregnating the calcined alumina with about 6% to about 30% by weight of molybdenum and from about 1% to about 6% by weight of nickel, drying the impregnated alumina and calcining the same at a temperature within the range of about 400° to about 800° C.

15. The method of claim 14 further characterized in that at least about 10.0% by weight of silica is coprecipitated with said basic aluminum sulfate.

16. The method of claim 1 further characterized in that a minor proportion of silica is coprecipitated with at least one of the aluminum sulfate precipitates.

References Cited in the file of this patent

UNITED STATES PATENTS

| | | |
|---|---|---|
| 2,780,603 | Burton | Feb. 5, 1957 |
| 2,844,523 | Veltman et al. | July 22, 1958 |
| 2,867,588 | Keith et al. | Jan. 6, 1959 |
| 3,016,347 | O'Hara | Jan. 9, 1962 |
| 3,027,233 | Michalko | Mar. 27, 1962 |